Figure 1:
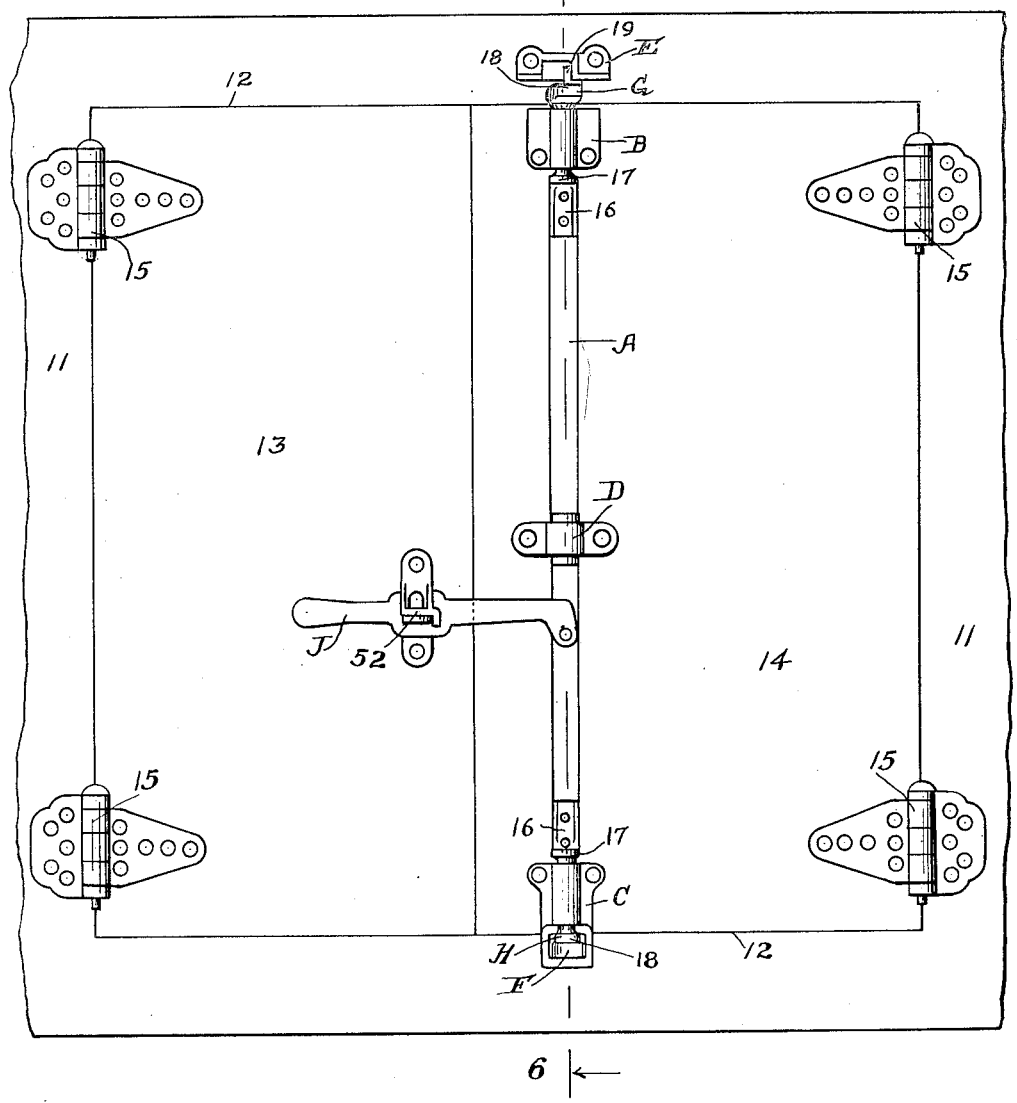

May 16, 1950 L. A. MARQUARDT 2,507,795
FASTENER FOR HINGED DOORS
Filed March 28, 1947 3 Sheets-Sheet 1

Inventor:
Leonard A. Marquardt.
By Henry Fuchs.
Atty.

May 16, 1950
L. A. MARQUARDT
2,507,795
FASTENER FOR HINGED DOORS
Filed March 28, 1947
3 Sheets-Sheet 2
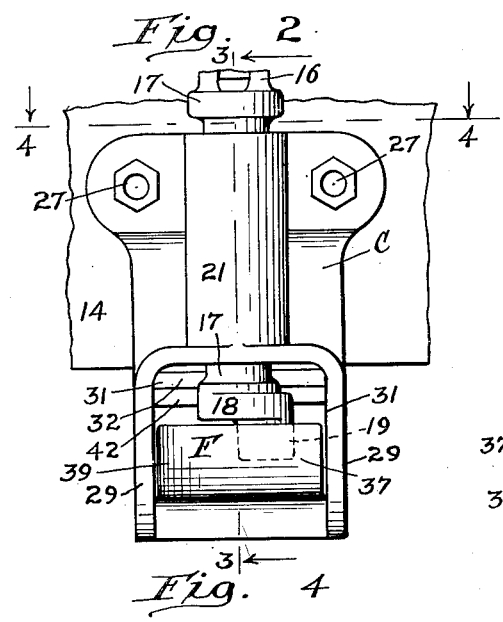
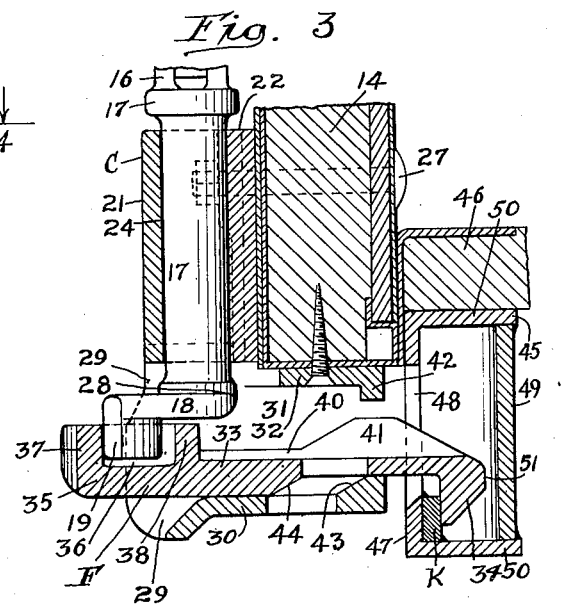
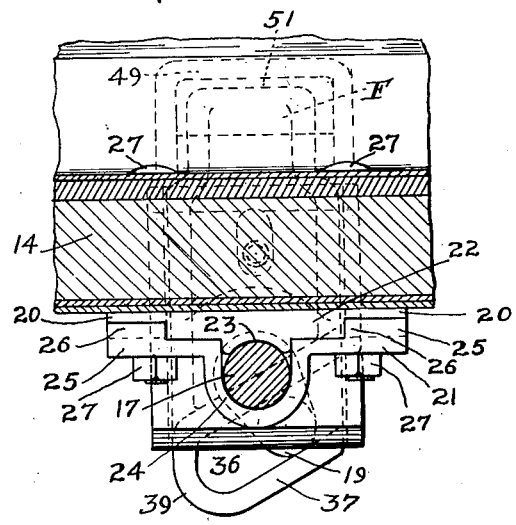
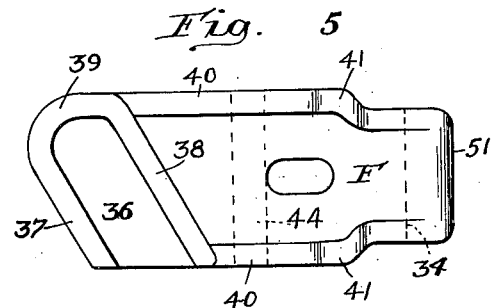
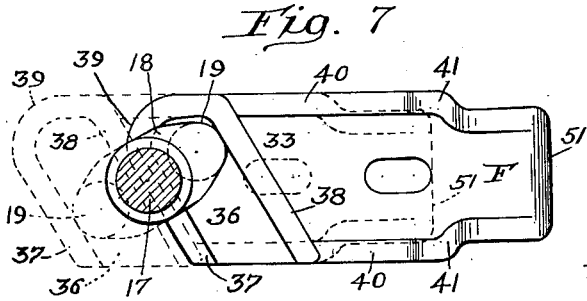
Inventor:
Leonard A. Marquardt.
By Henry Fuchs.
Atty.

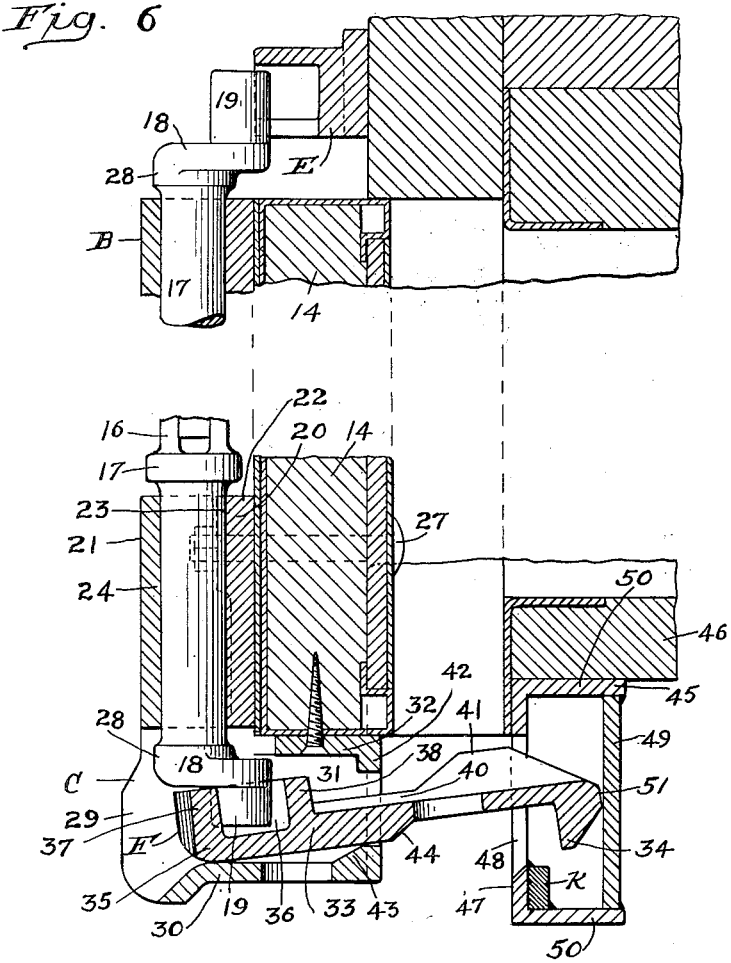

Patented May 16, 1950

2,507,795

UNITED STATES PATENT OFFICE 2,507,795

FASTENER FOR HINGED DOORS

Leonard A. Marquardt, Elmhurst, Ill., assignor to W. H. Miner, Inc., Chicago, Ill., a corporation of Delaware Application March 28, 1947, Serial No. 737,779

7 Claims. (Cl. 292—111)

This invention relates to improvements in fasteners for hinged doors of automobile trucks.

One object of the invention is to provide in a door fastener for hinged doors of automobile trucks, comprising a rotary operating bar mounted on one of the hinged doors, crank members at the top and bottom ends of the bar, an upper keeper with which the top crank member has camming engagement permanently fixed to the truck, a lower latch arm with which the bottom crank member has camming engagement slidably supported on the door and having a hooked end engageable with fixed holding means on the truck, means controlled by rotation of the operating bar in one direction for automatically lifting the hooked end of the latch arm out of operative hooked engagement with the holding means, and controlled by rotation of the operating bar in a reverse direction for automatically lowering the hooked end into operative engagement with said holding means.

A more specific object of the invention is to provide a fastener, as set forth in the preceding paragraph, wherein the means for automatically lifting and lowering the latch arm comprises cam means on the door over which the latch arm rides as the bar is rotated in forcing the door open and closed.

Other objects of the invention will more clearly appear from the description and claims hereinafter following.

In the accompanying drawings forming a part of this specification, Figure 1 is a rear elevational view of a portion of the body of an automobile truck provided with a door opening and a pair of hinged doors for closing said opening, illustrating my improvements in connection therewith. Figure 2 is a front elevational view, on an enlarged scale, of the structure at the lower left hand corner section of the right hand door shown in Figure 1. Figure 3 is a transverse, vertical sectional view, corresponding substantially to the line 3—3 of Figure 2. Figure 4 is a horizontal, sectional view, corresponding substantially to the line 4—4 of Figure 2. Figure 5 is a top plan view of the latch arm of my improved fastener. Figure 6 is a broken, vertical sectional view, corresponding substantially to the line 6—6 of Figure 1, showing the parts in the positions assumed when the door has been forced partly open. Figure 7 is a horizontal, sectional view, through the operating bar of my improved fastener, showing the latch arm in top plan, illustrating in full lines the relative positions of the operating bar and latch arm when the door has been partly opened, and in dotted lines the relative positions of the same when the door has been forced closed.

In said drawings, 11 designates the rear wall member of the body portion of an automobile truck having a door opening 12 therein, closed by a pair of hinged doors 13 and 14. Each door is provided with the usual hinges 15 along its vertical outer edge. As is common practice, the door 13, which is the door first closed, and the door 14 have their meeting edges beveled and inclined so that the door 14 will maintain the door 13 in closed position and wedge the same shut when the door fastener is actuated.

My improved door fastener, as shown in the drawings, comprises broadly an operating locking bar A, top and bottom bearing or guide brackets B and C, an intermediate guide bracket D, an upper fixed keeper E, a latch arm F carried by the lower guide bracket C, an upper keeper engaging crank member G, a lower crank member H, a pivoted operating handle lever J on the locking bar; and holding means K on the truck body with which the latch arm has hooked engagement.

The operating bar A is of rectangular cross section and has the crank members G and H fixed to the top and bottom ends thereof. The crank members G and H are in the form of end castings riveted to the bar. These end castings are of similar design. As is well known in this art, each end casting has the usual fork portion 16, which embraces the flat bar A as opposite sides and is secured thereto by rivet members. Outwardly of the fork portion 16, each end casting has a cylindrical bearing portion or section 17 which is rotatably supported in the corresponding bearing or guide bracket B or C. At the outer end thereof, outwardly of the bearing portion or section 17, each of the end castings is provided with a radial crank arm 18 having the usual crank pin 19 at its outer end.

The upper guide bracket B, which is fixed to the upper portion of the door 14 and has the bearing section 17 of the upper crank member G journaled therein, is of the usual well-known design. The intermediate bracket D, which is secured to the door 14, and supports the bar A between its ends, is also of the usual well-known design. The upper keeper E, which is fixed to the body of the truck above the door 14, is of the usual type employed in connection with door fasteners having a rotary bar provided with engaging crank members, being equipped with a cam slot within which the crank pin of the upper crank member has camming engagement to force the door open or closed.

The guide bracket C, within which the bearing section 17 of the lower keeper engaging crank member H is journaled, comprises a back plate 20 and a cover plate 21. The back plate 20 has a forwardly projecting, central enlargement 22 provided with a lengthwise extending, transversely concave bearing surface 23. The cover plate 21 has a central portion 24 of U-shaped, transverse cross section engaged over the enlargement 22 of the back plate, and side wings 25—25 extending laterally in opposite directions from said central U-shaped portion overlying the front of the plate 20 at opposite sides of the enlargement 22. The wings 25—25 have inwardly thickened portions 26—26 at their outer ends seated in depressed portions at opposite ends of the plate 20. The plates 20 and 21 of the bracket C are secured together by bolts 27—27 which also serve to secure the bracket to the door 14, the bolts 27—27 extending through suitable openings in said plates and door. The bearing section 17 of the lower crank member H is embraced between the U-shaped portion 24 of the cover plate 21 and the enlargement 22 of the back plate 20, the portion 24 and the enlargement 22 forming part bearings within which the section 17 is journaled. To prevent endwise displacement of the bearing section 17 of the crank member in the bracket C, the section 17 is preferably provided with enlarged collarlike portions 28—28 at opposite ends thereof, which overhang the bracket at the top and bottom ends thereof.

The front plate 21 of the lower bearing bracket is provided with a depending stirruplike guide section 29, which projects below the door 14. The guide section 29 has a horizontally disposed, bottom wall 30, spaced vertical side walls 31—31, and a relatively short top wall 32, defining a guideway therebetween. The side walls 31—31 are formed integral with the plate 21, being continuous with the lower end of said plate. The section 29 projects rearwardly of the back plate 20 in underlying relation to the door 14, with the top wall 32 engaging the bottom edge of said door. The wall 32 has its front edge offset inwardly with respect to the outer plane of the door 14, as shown in Figures 3 and 6.

The latch arm F is in the form of an elongated slide, supported in the stirruplike section 29 of the bracket C, being slidable on the bottom wall 30 and guided between the side walls 31—31. The latch arm comprises a platelike section 33, having a depending hook 34 at its rear end and an upstanding enlargement 35 at its front end provided with a transversely extending, inclined slot 36, which is open at the top and is defined by front and rear vertical walls 37 and 38 and a connecting curved, transverse, inner end wall 39. The plate section 33 is preferably reinforced by upstanding, vertical flanges 40—40 along its outer edges extending from the wall 37 to the hooked end of the arm or slide, which hooked end is of reduced width, as shown in Figures 5 and 7. Inwardly of the hooked end, the flanges 40—40 of the arm F have raised portions 41—41, which form abutments or shoulders for limiting upward tilting of the hooked end by engagement with a depending flange 42 at the rear end of the top wall 32 of the guide section 29.

The underneath side of the latch arm or slide F, inwardly of the hook 34, is cut out to provide clearance for an upstanding cam projection 43 at the rear end of the bottom wall 30 of the guide section 29. The front end wall of this cut out portion is beveled off to provide a cam face 44 adapted to ride over the cam projection 43 to effect lifting of the rear or hooked end of the slide as the latter is slid rearwardly in the guide section 29, as shown in Figure 6. The crank pin 19 of the lower crank member H projects into the slot 36 of the slide F and is continuously engaged in said slot to effect reciprocation of the slide as the operating bar is rotated in reverse directions.

The holding means K for the hooked end of the slide F is carried by the usual channel-shaped, transverse end sill 45 of the truck, located at the rear end of the truck body below the floor 46, inwardly of the doors. The vertical web 47 of the end sill 45 is provided with an opening 48 therethrough of rectangular outline, adapted to admit the hooked end of the slide F. This holding means is in the form of a transversely extending bar, welded to the inner side of the web 47 and having its upper edge flush with the lower edge wall of said opening. Inwardly of the holding means K, the sill 45 carries a vertically disposed abutment plate 49 of U-shaped transverse section, having the arms thereof extending inwardly toward the web of the sill and its top and bottom edges welded to the top and bottom flanges 50—50 of the sill.

The hook 34 of the slide F has a vertically disposed, flat abutment face 51 at its extremity adapted to engage the abutment plate 49 at the time the door is being forced open.

The operating lever J, which is of the type commonly employed in fasteners of this character, is pivoted to the bar A between its ends and is locked by the usual latch member 52 to hold the bar against rotation when the door is closed.

The operation of my improved fastener is as follows: Assuming that the doors are in the closed position shown in Figures 1 and 3, the lever J is unlatched and swung from left to right, as viewed in Figure 1, thereby rotating the bar A in contra-clockwise direction, as viewed in Figure 7, effecting rotation of the crank members G and H to cam the door outwardly away from the truck body, the upper crank member G cooperating with the upper keeper E in the usual manner. During this action, the crank pin 19 of the lower crank member H is swung against the rear wall 38 of the cam slot 36 of the slide F, forcing the latter to slide rearwardly in the stirruplike guide section 29 into abutting relation with the abutment plate 49. After the slide is thus buttressed against the plate 49 and arrested in its movement with respect to the truck body, further rotation of the crank member H forces the door outwardly by camming action of the crank pin thereof in the slot 36. As the door is forced outwardly with respect to the slide F, the cam face 44 of the latter rides upwardly on the cam projection 43, due to relative lengthwise displacement of the slide and the stirruplike guide section 29, lifting the hooked end of the slide clear of the holding means K, as shown in Figure 6. After the door has been forced to the partly open position shown in Figure 6, with the hooked end of the slide F thus lifted, the door is manually swung to fully open position. As will be evident, the slide F is maintained in this lifted or tilted position while the door is open, not being lowered until the operating bar is rotated in a reverse direction in forcing the door closed. Inasmuch as the slide F is carried on the stirruplike portion of the guide bracket C of the door 14, it is swung to out of the way position when the door is opened, thereby protecting the same against damage when the truck is backed against any object, such as a loading platform or wall of a building.

In the operation of closing the doors, the door 13 is first swung to approximately closed position. The door 14 is then manually swung inwardly against the door 13, thus bringing the upper crank member G into position to enter the slot of the upper keeper E, as is well-known in this art. At the same time, the slide F is carried toward the end sill 45 of the truck, together with the door 14, with the hooked end thereof held in raised position to clear the holding means K and pass beyond the same. The operating bar A is then rotated by the lever J in clockwise direction, as viewed in Figure 7, to cam the door inwardly by action of the upper and lower crank members G and H, the crank pin of the upper crank member entering the slot of the upper keeper to cam the door inwardly. At the same time, rotation of the lower crank member swings the crank pin thereof against the front wall 37 of the slide F, thereby sliding the same forwardly or outwardly in the guide section 29. During this action, the cam face 44 rides downwardly on the cam projection 43, lowering the hooked end of the slide F into latching engagement with the holding means K and locking the slide against outward movement with respect to the truck during further rotation of the bar to cam the door shut.

Inasmuch as the upper and lower crank members act in unison in forcing the door closed, the crank pin of the upper crank member, being engaged in the slot of the upper keeper during this operation, controls the position of the door while the slide at the lower end of the operating bar is being brought into hooked engagement with the holding means K to assure locking of the slide to the truck.

I claim:

1. In a fastener for a hinged door of a container, the combination with a vertically disposed, rotary operating bar mounted on the door; of a guide stirrup depending from said door; a slide having reciprocating movement in said stirrup toward and away from said container; means on said bar for reciprocating said slide by rotation of said bar, said slide having a hooked portion engageable with said container for holding said slide against movement outwardly away from said container; and a raised cam member on said guide stirrup over which the slide rides for lifting the hooked portion thereof out of engagement with the container.

2. In a fastener for a hinged door of a container, the combination with a vertically disposed, rotary operating bar mounted on the door; of a guide stirrup depending from said door; a slide having reciprocating movement in said stirrup toward and away from said container; means on said bar for reciprocating said slide by rotation of said bar, said slide having a hooked portion engageable with said container for holding said slide against movement outwardly away from said container; a cam on said guide stirrup over which the slide rides for lifting the hooked portion thereof out of engagement with the container; and abutment means on said container with which said slide is engageable to hold the same against inward movement toward said container.

3. In a fastener for a hinged door of a container, the combination with a vertically disposed, rotary operating bar mounted on the door; of a guide stirrup depending from said door; a raised cam projection on said stirrup; a slide having reciprocating sliding movement in said stirrup toward and away from said container, said slide having a hook at its rear end, said slide riding over the cam projection to raise and lower said rear end; and crank means on said bar operatively connected to said slide for reciprocating the same in reverse directions when said bar is rotated, said hooked end of the slide, when lowered, having engagement with cooperating holding means on said container for holding said slide against movement outwardly away from the container.

4. In a fastener for a hinged door of a container, the combination with a vertically disposed, rotary operating bar mounted on the door; of a guide stirrup depending from said door; a raised cam projection on said stirrup; a slide having reciprocating sliding movement in said stirrup toward and away from said container, said slide having a hook at its rear end, said slide riding over the cam projection to raise and lower said rear end; crank means on said bar operatively connected to said slide for reciprocating the same in reverse directions when said bar is rotated, said hooked end of the slide, when lowered, having engagement with cooperating holding means on said container for holding said slide against movement outwardly away from the container; and a fixed abutment member on said container with which said slide is engageable to hold said slide against inward movement toward said container.

5. In a fastener for a hinged door of a container, the combination with a guide stirrup depending from said door; of a slide having reciprocating movement in said stirrup, said slide having a hooked outer end engageable with keeper means on said container to hold said slide against outward movement away from the container; a transverse cam slot in said slide; cooperating cam means on said guide stirrup and slide for lifting the hooked end of said slide out of engagement with said keeper means; and a rotary operating bar on said door having an eccentric cam member thereon engaged in said cam slot for reciprocating said slide.

6. In a fastener for a hinged door of a container, the combination with a guide stirrup depending from said door; of a slide having reciprocating movement in said stirrup, said slide having a hook at its outer end and a transverse cam slot at its inner end; keeper means on the container with which said slide is detachably engageable to anchor the slide to the container against movement outwardly away from said container, the hooked end of said slide having camming engagement with the guide stirrup to guide the hooked end thereof to engaged and disengaged position with respect to said keeper; and operating means on the door comprising a rotary bar having an eccentric cam projection thereon engaged in the cam slot of said slide for reciprocating the latter in reverse directions.

7. In a fastener for a hinged door of a container, the combination with a vertically disposed rotary operating bar supported on said door; of a cam member at the lower end of said bar rotatable therewith; a latch arm slidably supported on the door with which said cam member has constant camming engagement; fixed holding means on said container, said latch arm having a tiltable hook portion engageable with said holding means; and cooperating means on said latch arm and door actuated by relative displacement of said latch arm and door for lowering and raising said tiltable hook portion to engage said hook portion with said holding means and disengage the same therefrom.

LEONARD A. MARQUARDT.

REFERENCES CITED

The following references are of record in the file of this patent:

UNITED STATES PATENTS

| Number | Name | Date |
|---|---|---|
| 510,686 | Hood | Dec. 12, 1893 |
| 1,573,866 | Rogers | Feb. 23, 1926 |
| 1,872,321 | Moore | Aug. 16, 1932 |
| 2,260,519 | Haseltine | Oct. 28, 1941 |
| 2,428,571 | Kump | Oct. 7, 1947 |